United States Patent [19]

Ellington, III

[11] 4,295,276

[45] Oct. 20, 1981

[54] TEMPLATE FOR ALIGNING A SHAFT

[75] Inventor: Rayburn P. Ellington, III, Peoria, Ill.

[73] Assignee: Caterpillar Tractor Co., Peoria, Ill.

[21] Appl. No.: 957,507

[22] Filed: Nov. 3, 1978

[51] Int. Cl.³ .............................................. G01B 7/31
[52] U.S. Cl. .................................... 33/181 R; 29/407;
29/271
[58] Field of Search ................. 29/406, 407, 464, 468,
29/271, 272; 33/174 Q, 174 G, 180 R, 180 AT,
181 R, 181 AT, 193, 412

[56] References Cited

U.S. PATENT DOCUMENTS

| | | | |
|---|---|---|---|
| 1,505,561 | 8/1924 | Guillet | 33/180 R |
| 2,516,854 | 8/1950 | Christian | 33/180 R |
| 2,616,184 | 11/1952 | Mendro et al. | 33/181 AT |
| 3,106,781 | 10/1963 | Eisele | 33/174 Q |
| 3,909,905 | 10/1975 | Giordano | 29/271 |
| 4,033,042 | 7/1977 | Bently | 33/181 R |

Primary Examiner—Lowell A. Larson
Attorney, Agent, or Firm—Phillips, Moore, Weissenberger, Lempio & Majestic

[57] ABSTRACT

A pair of members (16,20) are aligned in concentric relationship by engaging a template (26) between the members (16,20) to indicate the degree of eccentricity therebetween and by moving one (16) of the members into concentric relationship relative to the other member (20), as indicated by the template (26). The template (26) is circular and has a radial piloting slot (32) formed therethrough.

5 Claims, 5 Drawing Figures

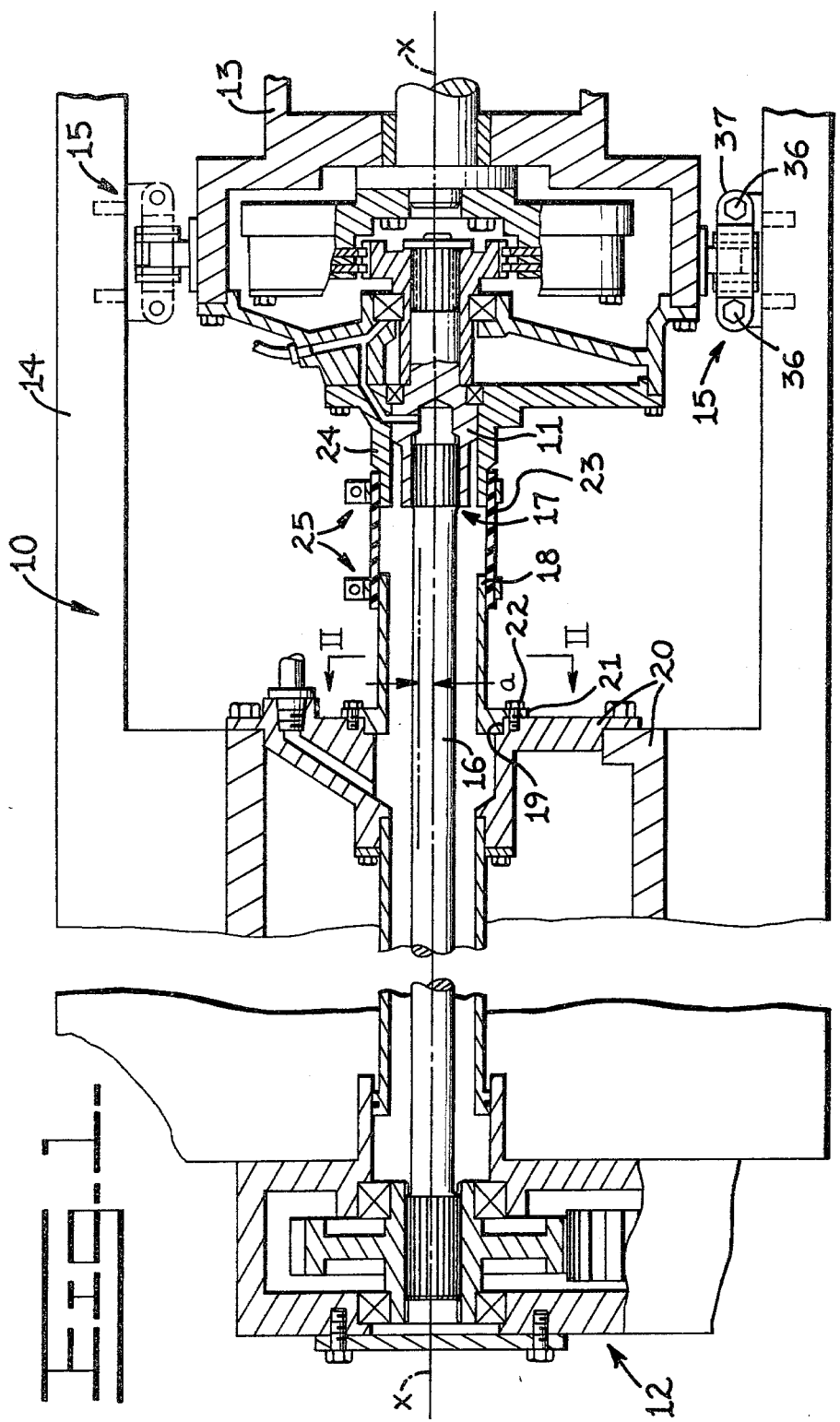

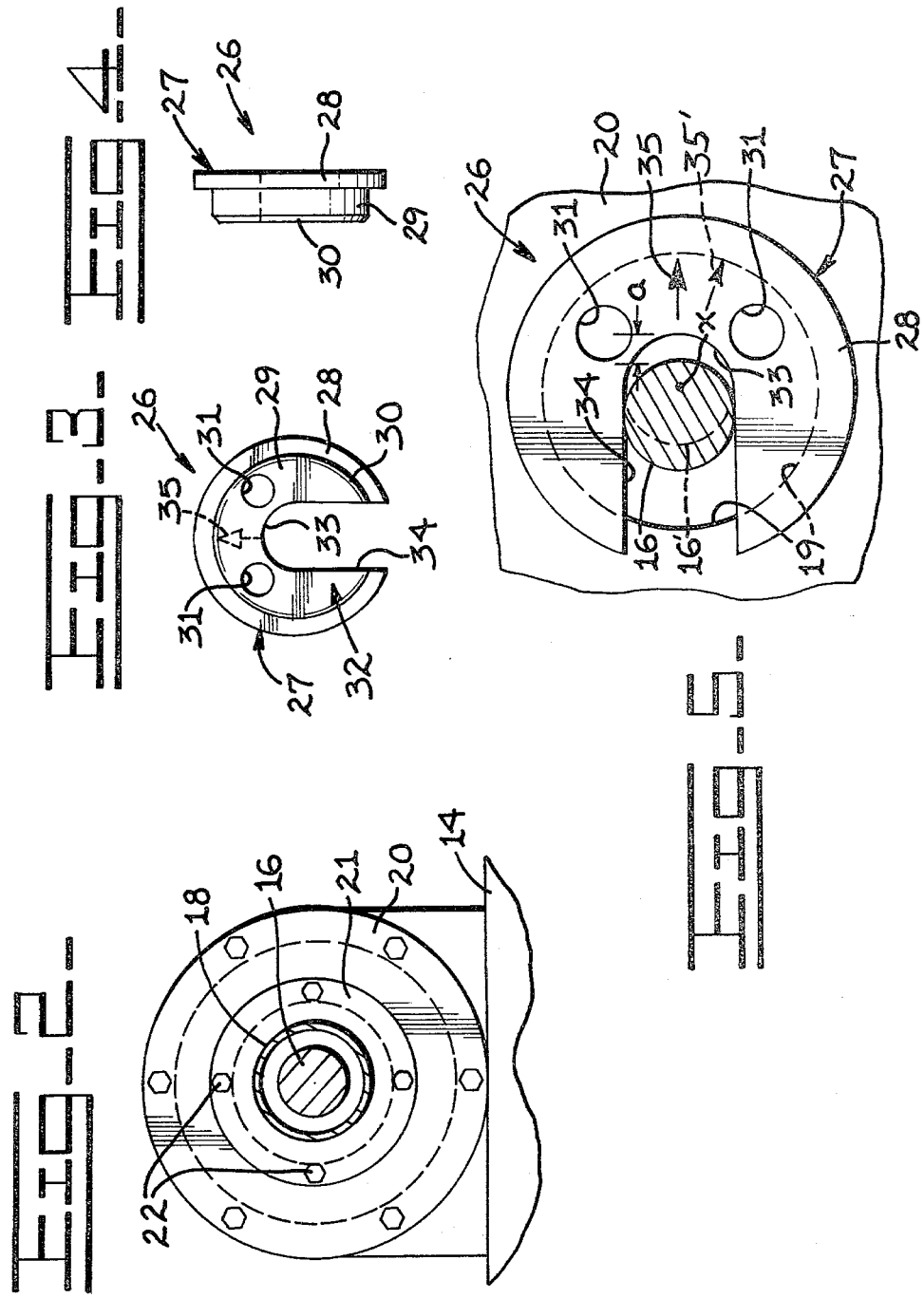

TEMPLATE FOR ALIGNING A SHAFT

DESCRIPTION

Technical Field

This invention relates to a template for aligning a pair of members in concentric relationship.

Background Art

A reoccurring problem in the assembling of a drive shaft group wherein an engine-driven power output shaft is connected to a power take-off by an intermediate drive shaft is one of precisely aligning such drive shaft. Misalignment of the drive shaft will tend to accelerate wear of spline connections interconnecting the drive shaft between the power output shaft and the power take-off and will also induce whipping of the drive shaft. Continued whipping of the drive shaft will obviously cause damage thereto as well as to attendant structures employed in the drive shaft group, including support bearing, seals, and the like.

A laborious and time consuming solution to this problem is to mount a dial indicator on the drive shaft to rotate therewith to measure misalignment of the shaft relative to a bore having a plunger of the indicator adapted to rotate therein. This procedure has proved difficult due to the limited working space available adjacent to the drive shaft and the inability of the workman to closely observe the dial of the indicator as it rotates to sweep the plunger within the bore. Furthermore, this procedure is by trial and error whereby the misalignment must be measured, motor mounts adjusted, the misalignment measured a second time, the motor mounts adjusted a second time, etc.

DISCLOSURE OF THE INVENTION

The present invention is directed to overcoming one or more of the problems as set forth above.

In one aspect of this invention, a shaft alignment template comprises a disc having a piloting slot means for engaging a shaft member therein and an annular flange having an annular hub means secured on one side thereof for engaging another member. The hub means has an outside diameter less than the outside diameter of the flange.

The method and template of this invention essentially provide a one-step alignment procedure whereby a shaft or the like may be expeditiously and economically placed in alignment to provide the shaft and attendant structures with a long service life.

BRIEF DESCRIPTION OF THE DRAWINGS

Other objects of this invention will become apparent from the following description and accompanying drawings wherein;

FIG. 1 is a sectioned, top plan view of a drive shaft group having a drive shaft adapted to be aligned in accordance with the method and template embodiment of the present invention;

FIG. 2 is a cross sectional view through the drive shaft group, taken in the direction of II—II in FIG. 1;

FIGS. 3 and 4 are front and side elevational views, respectively, of the template; and FIG. 5 is an enlarged view similar to FIG. 2, but showing the template mounted on the drive shaft during alignment thereof.

BEST MODE FOR CARRYING OUT THE INVENTION

FIG. 1 illustrates a drive shaft group 10 for connecting an engine-driven output shaft 11 to a transfer gear assembly 12 for driving the wheels (not shown) for a vehicle, such as a tractor. Engine output shaft 11 is rotatably mounted in a block 13 of an internal combustion engine for being driven thereby in a conventional manner. Block 13 is suitably mounted on a frame 14 of the vehicle in a conventional manner by a pair of side motor mounts 15 and a forward motor mount (not shown) in a conventional manner.

Motor mounts 15 are adjustable to permit horizontal side shifting of engine block 13 to properly align shaft 11 with a drive shaft 16, connected to shaft 11 at a standard spline connection 17. A metallic tube 18 has a first end thereof mounted in a bore 19, defined in a multi-part housing 20 of transfer gear assembly 12, and has a radial flange 21 thereof secured to housing 20 by a plurality of circumferentially disposed bolts 22. An elastomeric-based hose 23 is secured between a second end of tube 18 and a hub 24 secured to engine block 13 by a pair of standard hose clamps 25.

It is a primary object of the present invention to place shafts 11 and 16 and gear assembly 12 in linear alignment and coincident with a common longitudinal and rotational axis X. As discussed above, heretofore such alignment has been achieved on a trial and error basis by mounting a dial indicator on drive shaft 16 to have the reciprocal plunger thereof engage within bore 19, for example, upon removal of tube 18. As further indicated above, this procedure has proven difficult and laborious due to the limited space available and the inability of the workman to continuously observe the dial of the indicator upon rotation of drive shaft 16.

Referring to FIGS. 3-5, a template 26 is provided to ensure proper alignment of shafts 11 and 16 on a "go no-go" basis. Template comprises a disc 27 having an annular flange 28 and an annular mounting hub 29 formed in concentric relationship on one side of flange 28. Hub 29 has an outside diameter less than that of flange 28 and is sized to slip-fit into bore 19. The outer edge of hub 29 is preferably chamfered at 30 to aid in inserting the hub in bore 19.

One or more finger holes 31 are preferably formed through template 26 to facilitate rotation of the template by a workman. A piloting slot 32 is formed through template 26 and includes a semi-circular opening 33 disposed centrally of the template and a slot portion 34 extending radially outwardly from opening 33 in tangential relationship therewith to terminate in open relationship at the periphery of the template. A directional arrow 35 is preferably imprinted on the outer face of hub 29 in linear alignment with slot 34 for purposes hereinafter described.

INDUSTRIAL APPLICABILITY

The herein described method and template 26 find particular application for aligning an intermediate drive shaft, such as drive shaft 16 in FIG. 1, between power output shaft 11 of an engine and transfer gear assembly 12 of a tractor or the like. However, it should be understood that the method and template herein described will find many other applications wherein it is desired to align a pair of first and second members in concentric relationship.

Referring to FIGS. 1, 2 and 5, the following method steps are employed to correctly align shaft 16 between engine driven output shaft 11 and transfer gear assembly 12. Assuming that drive shaft group 10 has been assembled as shown in FIG. 1 to place shaft 16 in approximate concentric relationship with respect to bore 19 (the degree of eccentricity being depicted by a in FIGS. 1 and 5), the workman would first release the leftwardmost hose clamp 25 in FIG. 1 and also bolts 22 to slip tube 18 rightwardly within hose 23.

It should be understood that vertical adjustment of engine block 13 is not normally required since vertical alignment of interconnected shafts 11 and 16 and transfer gear assembly 12 are preset upon manufacture and assembly of drive shaft group 10. However, in those applications wherein slight vertical adjustment of engine block 13 is required, misalignment would be made obvious to the workman upon mounting of template 26 on shaft 16 and insertion of hub 29 of the template within bore 19. For example, should arrow 35 be displaced to its phantom line position 35' (FIG. 5), the workman will visually note that the engine must be lowered so that template 26 can be rotated to display arrow 35 in its horizontal, solid line position whereby the vertical alignment is effected. In the event of vertical misalignment, standard shims could be employed with motor mounts 15 to lower or raise engine block 13 to properly align shafts 11 and 16 and gear assembly 12 in a vertical direction.

Assuming proper vertical alignment of drive shaft 16, the workman is now able to insert piloting slot 32 of template 26 on the shaft (FIG. 5) and engage hub 29 within bore 19. Assuming a degree a of eccentricity and misalignment relative to common axis X (FIGS. 1 and 5), arrow 35 would indicate to the workman that engine block 13 would require shifting to the right, in the direction of arrow 35 in FIG. 5, to place shaft 16 in concentric relationship with respect to bore 19. It should be further noted that such eccentricity and resulting misalignment of shaft 16 will prevent the workman from rotating hub 29 of template 26 within bore 19.

The workman need only release bolts 36 and caps 37 of motor mounts 15 whereby engine block 13 may be shifted horizontally (upwardly in FIG. 1 and rightwardly in FIG. 5) until the workman is enabled to freely rotate template 26 in bore 19, i.e., with shaft 16 fully engaged within semi-circular opening 33 of piloting slot 32. Bolts 36 of motor mounts 15 may be then retightened to secure the engine block in place on vehicle frame 14 whereby shafts 11 and 16 and transfer gear assembly 12 are placed in linear alignment with their rotational axes being coincident with common axis X. Tube 18 is then resecured in place by tightening down the loosened hose clamp 25 and bolts 22, after removal of template 26.

It should be noted in FIG. 5 that if the eccentricity a of shaft 16 with respect to bore 19 is in the opposite direction, that arrow 35 would point leftwardly to indicate to the workman that engine block 13 and shaft 16 would require downward adjustment in FIG. 1 and leftward adjustment in FIG. 5. It should be further noted that drive shaft 16 is sufficiently flexible to withstand some bending and misalignment prior to its final alignment in drive shaft group 10. The attachment of drive shaft 16 to transfer gear assembly 12 thus, in effect, provides a pivot point for permitting block 13 and attached drive shaft 16 to be shifted for alignment purposes. Template 26 is preferably placed as far as possible away from the connection of drive shaft 16 to transfer gear assembly 12 to provide the maximum degree of alignment, i.e., the degree of misalignment a in FIG. 1 becomes more pronounced toward the rightward end of drive shaft 16.

Other aspects, objects and advantages of this invention can be obtained from a study of the drawings, the disclosure and the appended claims.

We claim:

1. A shaft alignment template (26) comprising:
   a disc (27) having a diameter larger than the thickness thereof,
   a piloting slot means (32) formed through said disc (27) for engaging a shaft member therein, said piloting slot means (32) including a semi-circular opening (33) disposed centrally of said disc and a slot portion (34) extending radially outwardly from said opening (33) in tangential relationship therewith and terminating in open relationship at the periphery of said disc (27), and
   an annular flange (28) having an annular hub means (29) secured on only one side thereof for engaging another member, said hub means (29) having an outside diameter which is less than the outside diameter of said flange (28).

2. The template of claim 1 further comprising an annular chamfer (30) formed on a free end of said hub means (29).

3. The template of claim 1 further comprising at least one finger hole (31) formed through said disc (27).

4. The template of claim 1 further comprising indicia means (35) on said disc (27) for indicating the direction of movement of shaft member (16) mounted in said piloting slot means (32) upon alignment thereof with another member (20).

5. The template of claim 4 wherein said indicia means includes an arrow (35) formed on said disc (27) and aligned with said piloting slot means (32).

* * * * *